(12) United States Patent
White

(10) Patent No.: US 7,862,882 B1
(45) Date of Patent: Jan. 4, 2011

(54) RE-POSITIONABLE MAGNETIC ART APPARATUS

(76) Inventor: Michelle M. White, 720 100th Ave. North, Apt. 103, Saint Petersburg, FL (US) 33702

(*) Notice: Subject to any disclaimer, the term of this patent is extended or adjusted under 35 U.S.C. 154(b) by 945 days.

(21) Appl. No.: 11/680,988

(22) Filed: Mar. 1, 2007

Related U.S. Application Data

(60) Provisional application No. 60/767,375, filed on Mar. 22, 2006.

(51) Int. Cl.
B41M 5/00 (2006.01)

(52) U.S. Cl. ............ 428/195.1; 428/121; 434/73; 434/186; 434/190; 434/301; 40/600; 273/239; 273/242

(58) Field of Classification Search ........... 428/195.1, 428/121; 273/239, 242; 434/73, 186, 190, 434/134, 168, 301; 40/600
See application file for complete search history.

(56) References Cited

U.S. PATENT DOCUMENTS

| | | | |
|---|---|---|---|
| 4,307,886 A * | 12/1981 | Kemper | ............... 273/239 |
| 5,425,540 A | 6/1995 | Senel | |
| 5,839,729 A * | 11/1998 | Watanabe | ............... 273/276 |
| 2005/0042584 A1 | 2/2005 | Ekberg | |
| 2006/0046240 A1 | 3/2006 | Fung | |

FOREIGN PATENT DOCUMENTS

JP 2000238492 A * 9/2000

* cited by examiner

*Primary Examiner*—Bruce H Hess
*Assistant Examiner*—Tamra L Amakwe
(74) *Attorney, Agent, or Firm*—Crossley Patent Law; Mark A. Crossley

(57) ABSTRACT

A re-positionable magnetic art apparatus which is provided in a variety of shapes and sizes. Characters of the apparatus are attracted to a sheet which underlies a picture within a frame, the frames provided in a variety of shapes. A clear laminate covering the picture separates the removably positionable characters from the picture, thereby providing for picture clarity throughout the life of the apparatus. Pictures are provided with characters which match both picture theme and picture scale, ensuring realistic artistic expression. Accessory character material is available which is printable on an inkjet printer.

2 Claims, 2 Drawing Sheets

RE-POSITIONABLE MAGNETIC ART APPARATUS

CROSS-REFERENCE TO RELATED APPLICATIONS

U.S. Provisional Application No. 60/767,375 filed on Mar. 22, 2006

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various children's books are available which provide interactive placement of pieces within the books. The books thereby provide for teaching association of stories, pictures, objects, and the like. Game boards are also provided which magnetically attract game pieces. Books, though, are inherently useable by children only when relegated to a useable size. Existing books and game boards are further restrictive with regard to chosen placement of associated pieces. Focus is on correct placement of associated pieces in a game. Focus is either on or even required in placement of pieces in existing interactive books. What is needed is a themed background platform with cooperatively themed magnetically attracted characters which interact with that theme. The characters should allow for artistic expression in removable placement, whereby no chosen placement is incorrect or rejected, anywhere on the platform.

The platform should be available in plurality of sizes and, further, in a plurality of shapes which further cooperate with the chosen theme. The present apparatus provides these features in a lightweight apparatus.

FIELD OF THE INVENTION

The re-positionable magnetic art apparatus relates to a themed mural picture board with selectively positionable characters magnetically attracted to the board such that a user can creatively construct their own pictures.

DESCRIPTION OF THE PRIOR ART

Prior related art U.S. Pat. No. 5,425,540 issued to Senel 1995-06-20 teaches a selectively magnetically attractive game board assembly. The assembly features a slideably removable magnetic panel such that game pieces may be selectively attracted to the platform. The assembly does not provide for artistic expression but, instead, relegates users to correct or incorrect placement of pieces only. Further, the assembly is comprised of a book, a fact which inherently includes size limitations in order that the book can be successfully used by a child. U.S. Pat. Application Publication No. 2006/0046240A1 issued to Fung 2006-03-02 teaches a story book and play set with pivotal center section that provides a play stage having a stage base and a stage background that can be supported in an upright position relative to the stage base. Play pieces are related to the story or theme of the book and are sized, shaped, and configured to provide play action with the play stage. The play pieces may be specifically located and attachable to a page. The set does not include magnetically attracted characters which allow fully selectable positioning and thereby artistic expression, as does the present apparatus. U.S. Pat. Application Publication No. 2005/0042584A1 issued to Ekberg 2005-02-24 teaches an interactive magnetic book and display system and method. The book does not allow selective positioning of characters in artistic expression, as does the present apparatus. The book requires that pieces be placed only in specific locations which provide magnetic attraction of pieces in those locations only. The book teaches placement of pieces to correspond with the story, in those specific related positions.

While the above-described devices fulfill their respective and particular. objects and requirements, they do not describe a re-positionable magnetic art apparatus that provides for the advantages of the present re-positionable magnetic art apparatus. In this respect, the present re-positionable magnetic art apparatus substantially departs from the conventional concepts and designs of the prior art. Therefore, a need exists for an improved re-positionable magnetic art apparatus.

SUMMARY OF THE INVENTION

The general purpose of the re-positionable magnetic art apparatus, described subsequently in greater detail, is to provide a re-positionable magnetic art apparatus which has many novel features that result in an improved re-positionable magnetic art apparatus which is not anticipated, rendered obvious, suggested, or even implied by prior art, either alone or in combination thereof.

To attain this, the re-positionable magnetic art apparatus provides platforms in a variety of shape embodiments, including square, rectangle, circular, and oval. A variety of pictures are optionally available for each frame shape. Pictures are disposed under a clear laminate so that picture clarity does not suffer damage over use and time. Pictures are provided in a variety of depictions, such as seascapes and landscapes, for example. Characters are provided to match pictures. Characters provided are scaled to correctly match picture scale, thereby providing further realism. A variety of sizes of the apparatus are provided. Each is comprised of a foam board platform to insure light weight and portability. Light weight further enables relatively large platforms.

Two magnetic attraction embodiments are provided. One embodiment provides a magnetic sheet within the frame. The matching characters are of partial ferrous metal content. Another embodiment provides a partially ferrous sheet within the frame, with magnetic material included in the characters.

The characters may be positioned anywhere on the laminate which covers the picture, thereby ensuring complete artistic interpretation and freedom. The characters are also provided for purchase separately from the frame and frame related components. Additionally themed characters are provided in a further variety of themes beyond those specifically stated herein. Further ink jet printable material is provided such that a user can even create their own characters upon the material via an inkjet printer, then cut out the characters for use on a chosen platform shape and picture theme. Material is provided in both ferrous metal content and magnetic content.

Thus has been broadly outlined the more important features of the improved re-positionable magnetic art apparatus so that the detailed description thereof that follows may be better understood and in order that the present contribution to the art may be better appreciated.

An object of the re-positionable magnetic art apparatus is to provide portability.

Another object of the re-positionable magnetic art apparatus is to provide for freedom of artistic expression in placement of cooperative characters upon the platform laminate.

A further object of the re-positionable magnetic art apparatus is to removably position characters.

An added object of the re-positionable magnetic art apparatus is to provide a plurality of themes of characters and platform pictures.

And, an object of the re-positionable magnetic art apparatus is to provide a plurality of shapes of the platform.

Still another object of the re-positionable magnetic art apparatus is to provide that the themed picture background retains its quality.

Additionally, an object of the re-positionable magnetic art apparatus is to provide for printing characters via an inkjet printer.

A further object of the re-positionable magnetic art apparatus is to provide for user character creation.

These together with additional objects, features and advantages of the improved re-positionable magnetic art apparatus will be readily apparent to those of ordinary skill in the art upon reading the following detailed description of presently preferred, but nonetheless illustrative, embodiments of the improved re-positionable magnetic art apparatus when taken in conjunction with the accompanying drawings.

In this respect, before explaining the current embodiments of the improved re-positionable magnetic art apparatus in detail, it is to be understood that the re-positionable magnetic art apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved re-positionable magnetic art apparatus.

It is therefore important that the claims be regarded as including such equivalent constructions insofar as they do not depart from the spirit and scope of the re-positionable magnetic art apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 4 thereof, the principles and concepts of the re-positionable magnetic art apparatus generally designated by the reference number 10 will be described.

Figure 1:
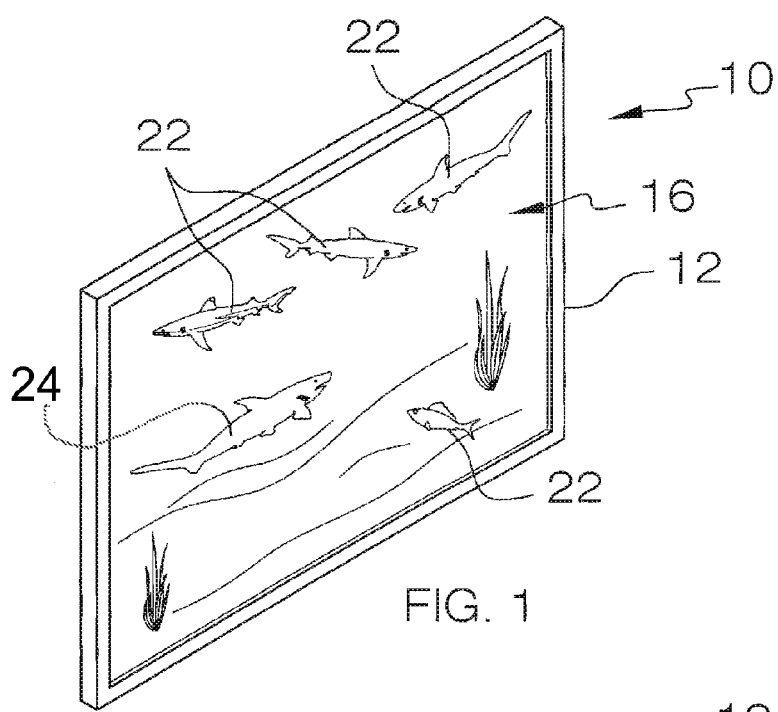
FIG. 1 is a perspective view of one embodiment of the apparatus, rectangularly shaped.
Figure 2:
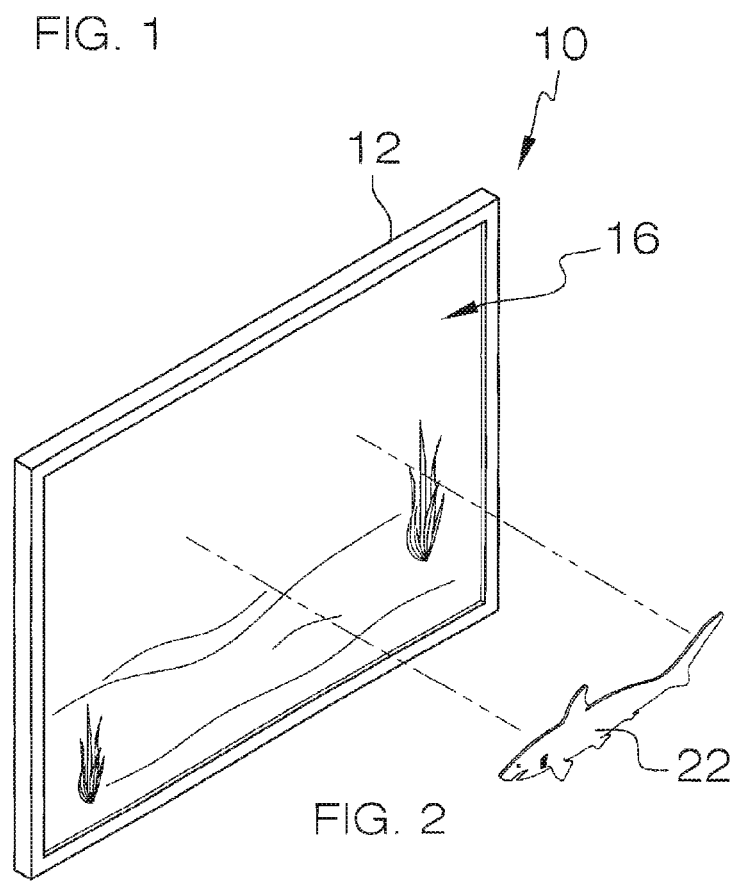
FIG. 2 is a perspective view of FIG. 1, with a plurality of characters removed.

Referring to FIGS. 1 and 2, the multi-layered magnetic art apparatus 10 provides selectively positionable characters 22. The characters 22 are varied in various embodiments of the apparatus 10. Each embodiment of the apparatus 10 comprises a themed picture 16. Pictures 16 are provided which depict seascapes, landscapes, game grids, and sports fields. Blank picture 16 backgrounds are also provided. Blank background pictures 16 are useful with number characters 22 and letter characters 22. As further example of frame 12 defined platform 20 shape embodiments, a football field is provided with a rectangular frame 12 and platform 20. A seascape picture 16, as example, is optionally provided in a circular frame 12 or oval frame 12, to depict a ship porthole. A landscape picture 16 is optionally provided in a square frame 12 or rectangle frame 12, as a potential view from a window. Additionally, as is illustrated, the themed picture 16 of a seascape is provided with aquatic characters 22 which are scaled to correctly match the picture 16 contents, thereby further providing realism in artistic endeavors of the user. Each picture 16 is provided with appropriately matched and scaled characters 22. Pictures 16 and characters 22 provided include a landscape picture 16 and landscape characters 22, a seascape picture 16 and seascape characters 22, a sports field picture 16 and sports characters 22, a gaming grid picture 16 and gaming characters 22, a blank picture 16 and number characters 22, and a blank picture 16 and letter characters 22.

Figure 3:
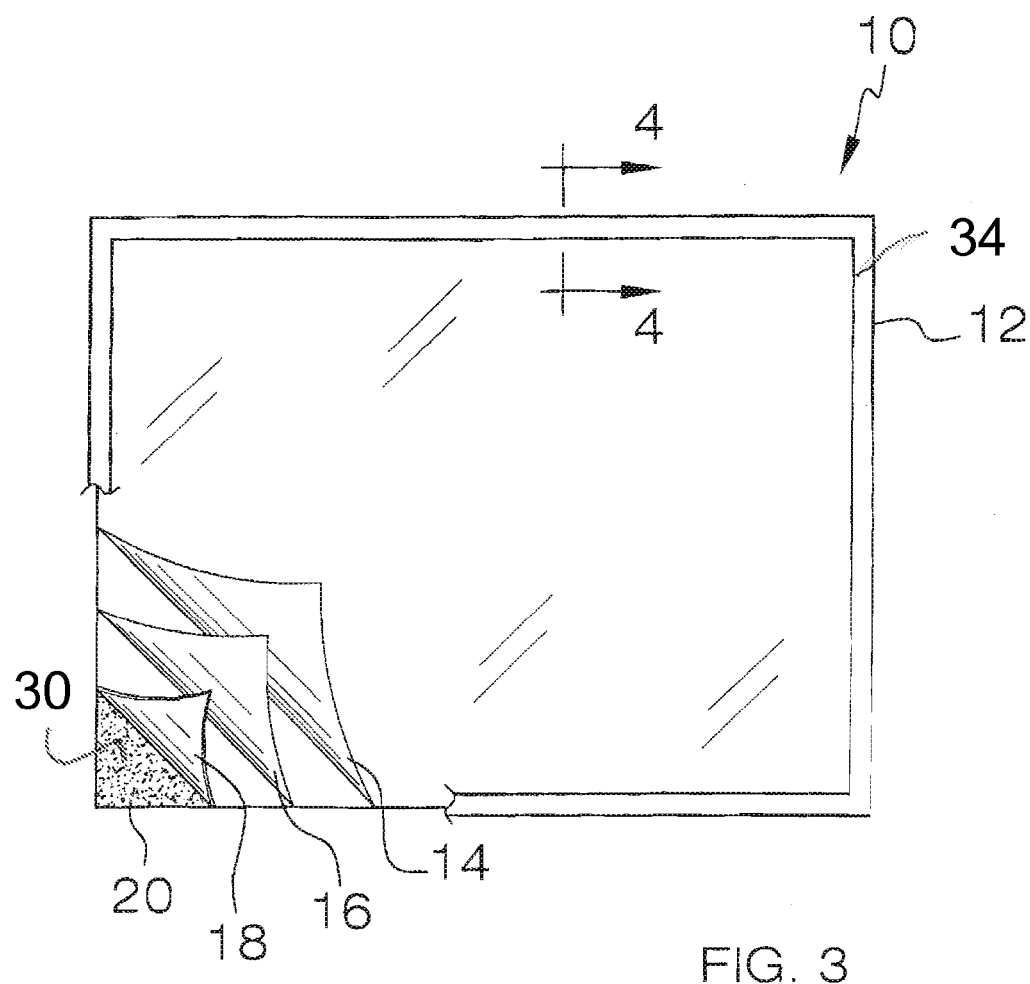
FIG. 3 is a top plan view of a rectangular embodiment of the apparatus, illustrating the layered makeup of the platform, magnetic sheet, picture, and clear laminate.
Figure 4:
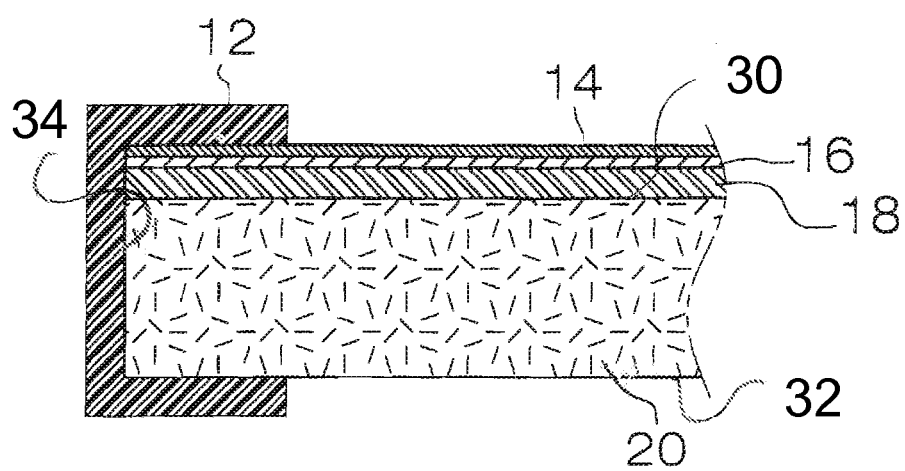
FIG. 4 is partial cross sectional view of FIG. 3.

Referring to FIGS. 3 and 4, the apparatus 10 is comprised of a foam board platform 20. The platform 20 has a top side, a bottom side and the exterior border with frame 12. In one embodiment of the apparatus 10, the magnetic sheet 18 has a top and a bottom. The bottom of the magnetic sheet 18 is affixed to the top side of the platform 20. The themed picture 16 is affixed to the top of the magnetic sheet 18. The clear laminate 14 is affixed to a top of the themed picture 18. The clear laminate 14 negates picture 16 wear such that pictures 16 retain brilliance and detail throughout the life of the apparatus 10 and are not subject to wear from extraneous objects or from the use of the characters 22. The frame 12 surrounds the platform 20. Frames 12 and platform 20 are of like shape in each particular embodiment of the apparatus 10. The plurality of characters 22 are partially comprised of a ferrous material attracted to the laminate 14 via the underlying magnetic sheet 18. The characters 22 accompanying the magnetic sheet 18 embodiment are printable via magnetic inkjet printer material.

An alternate embodiment of the apparatus 10 is comprised of a partially ferrous material sheet 18. The ferrous material sheet 18 is located and affixed identically to the magnetic material sheet 18. Conversely, the characters 22 of this ferrous sheet 18 embodiment are partially comprised of a magnetic material attracted to the laminate 14 via the underlying partially ferrous sheet 18. All other elements of the apparatus 10 remain as in the previously above-outlined embodiment. The characters 22 of the ferrous material sheet 18 are thereby usable on other ferrous objects, so that the characters 22 are not restricted to platform 20 use only.

The characters 22 scaled proportionately to the pictures 16 provide for realistic artistic creativity, with no restriction as to character 22 placement on the laminate 14.

Referring again to FIGS. 1, 3, and 4, the foam platform 20 has a top side 30 spaced apart from the bottom side 32, and a border 34. The sheet 18, which may be magnetic or ferrous, is affixed to the platform 20 top side 30. The plurality of themed pictures 16 is importantly selectively affixed atop the sheet 18. The clear laminate 14 is affixed atop the themed picture 16. The border 34 is shared by the platform 20, the sheet 18, the themed picture 16, and the clear laminate 14. The frame 12 surrounds the border 34. The themed pictures 16 are thus secured between the sheet 18 and clear laminate 14 which protects the themed pictures 16 from wear and tear.

Referring again to FIG. 1, a printed character material 24 is provided which is formed by printing user-selected characters on an ink-jet printer for cutout to place atop the clear laminate 14. The character material 24 is ferrous material or, alternately, magnetic material.

With respect to the above description then, it is to be realized that the optimum dimensional relationships for the parts of the re-positionable magnetic art apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the re-positionable magnetic art apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the re-positionable magnetic art apparatus may be used.

Therefore, the foregoing is considered as illustrative only of the principles of the re-positionable magnetic art apparatus. Further, since numerous modifications and changes will readily occur to those skilled in the art, it is not desired to limit the re-positionable magnetic art apparatus to the exact construction and operation shown and described, and accordingly, all suitable modifications and equivalents may be resorted to, falling within the scope of the re-positionable magnetic art apparatus.

What is claimed is:

1. A repositionable magnetic art apparatus consisting of, in combination:
   a foam platform, the platform having a top side, a bottom side spaced apart from the top side, and a border;
   a magnetic sheet affixed to the top side of the platform;
   at least one themed picture affixed to the top of the magnetic sheet;
   a clear laminate affixed to a top wall of the themed picture;
   said border shared by the platform, the magnetic sheet, the themed picture, and the clear laminate;
   a frame surrounding the border;
   a plurality of partially ferrous characters removably and selectively positioned on the clear laminate, each character having a plurality of shapes and sizes, the characters having a character type and a scale corresponding to each of the themed pictures; and
   a printed partially ferrous character material removably affixed atop the clear laminate.

2. A repositionable magnetic art apparatus consisting of, in combination:
   a foam platform, the platform having a top side, a bottom side spaced apart from the bottom side, and a border;
   a magnetic sheet affixed to the top side of the platform;
   a plurality of themed pictures affixed atop the magnetic sheet;
   a clear laminate affixed atop the themed picture;
   said border shared by the platform, the magnetic sheet, the themed picture and the clear laminate;
   a frame surrounding the border;
   a plurality of partially ferrous characters removably and selectively positioned on the clear laminate; and
   a printed partially ferrous character material removably affixed atop the clear laminate.

* * * * *